(12) United States Patent
Pohl et al.

(10) Patent No.: US 8,753,519 B2
(45) Date of Patent: Jun. 17, 2014

(54) REMOVAL OF SILICON FROM BRINE

(75) Inventors: Werner Pohl, Essen (DE); Christoph Stegemann, Unna (DE); Thomas Steinmetz, Dortmund (DE); Sami Pelkonen, Dortmund (DE)

(73) Assignee: UHDE GmbH, Dortmund (DE)

( * ) Notice: Subject to any disclaimer, the term of this patent is extended or adjusted under 35 U.S.C. 154(b) by 969 days.

(21) Appl. No.: 12/735,233

(22) PCT Filed: Dec. 23, 2008

(86) PCT No.: PCT/EP2008/011079
§ 371 (c)(1),
(2), (4) Date: Dec. 2, 2010

(87) PCT Pub. No.: WO2009/083234
PCT Pub. Date: Jul. 9, 2009

(65) Prior Publication Data
US 2011/0089117 A1 Apr. 21, 2011

(30) Foreign Application Priority Data
Dec. 28, 2007 (DE) .......................... 10 2007 063 346

(51) Int. Cl.
*C02F 1/00* (2006.01)
*C02F 1/52* (2006.01)
(52) U.S. Cl.
USPC ........... 210/723; 210/767; 210/638; 210/639; 210/748.2; 210/749; 205/536
(58) Field of Classification Search
None
See application file for complete search history.

(56) References Cited

U.S. PATENT DOCUMENTS

| 3,729,550 | A | * | 4/1973 | Boyum et al. | 423/497 |
| 3,846,289 | A | * | 11/1974 | Jeris et al. | 210/610 |
| 4,034,063 | A | * | 7/1977 | Rosar et al. | 75/429 |
| 4,155,820 | A | | 5/1979 | Ogawa et al. | |
| 4,274,929 | A | | 6/1981 | Novak | |
| 4,454,044 | A | * | 6/1984 | Klein | 210/663 |
| 4,818,415 | A | * | 4/1989 | Kramer et al. | 210/748.01 |
| 4,946,565 | A | * | 8/1990 | Hakansson | 205/503 |
| 5,045,214 | A | * | 9/1991 | Walker | 210/717 |
| 8,062,530 | B2 | * | 11/2011 | Schoen et al. | 210/710 |

FOREIGN PATENT DOCUMENTS

| DE | 28 16 772 A1 | 10/1978 |
| DE | 195 46 135 C1 | 6/1997 |
| EP | 0 866 768 B1 | 3/2000 |
| FR | 2 622 212 A1 | 4/1989 |

* cited by examiner

*Primary Examiner* — Lore Jarrett
*Assistant Examiner* — Benjamin J Behrendt
(74) *Attorney, Agent, or Firm* — Marshall & Melhorn, LLC

(57) ABSTRACT

A process for removing silicon compounds from aqueous NaCl brine includes, first, adjusting a weak brine to a pH value of less than 3 with hydrochloric acid. Iron(III) chloride or other trivalent iron ions are added to the acidified weak brine, the obtained weak brine is then continuously fed to a stirred dissolution vessel which contains undissolved salt in addition to brine. Fresh salt is charged batch-wise and intermittently to the dissolution vessel to produce strong brine. The obtained strong brine is fed to a stirred buffer vessel, the pH value in this buffer vessel being maintained at a level ranging from 5 to 8. A strong-brine flow is continuously withdrawn from the buffer vessel and filtered, and the filtrate containing the added iron and silicon is discharged. Also a system for carrying out this process is disclosed.

6 Claims, 2 Drawing Sheets

REMOVAL OF SILICON FROM BRINE

BACKGROUND OF THE INVENTION

The invention relates to a process and the related contrivance for removing silicon compounds from brine intended for electrolysis. Silicon is normally contained as an accompanying element in the form of silica in rock salt and sodium chloride as found in salt deposits or extractable from sea salt. In brine, silicon is contained in monomer or amorphous form or as polysilica, in agglomerates, and it disturbs the electrolysis process.

According to the conventional state of the art as described, for example, in U.S. Pat. No. 4,274,929 A, the silicon is removed by adding magnesium chloride and increasing the pH value. By means of a very time-consuming mixer-settler process the precipitated silicon can be separated and removed from the brine.

U.S. Pat. No. 4,946,565 A also contains a process for removing silicon compounds from brine. Here, Fe(II) or Fe(III) are used which form a complex with the silicon impurities contained in the brine, the said complex precipitating in a sedimentation tank. Here as well, the process is carried out at an alkaline pH value.

Much the same can be said of DE 2816772 A1. It is claimed that a chemical reagent which can be sodium hydroxide, sodium carbonate, calcium hydroxide, calcium chloride, barium chloride, barium carbonate and/or iron(II) chloride is added to the solution for the precipitation and removal of impurities and a slurry of impurities jointly present with the reagent is simultaneously fed to the solution, thus precipitating the silicon dioxide jointly with the impurities. A pH value of 8 to 11 is adjusted during precipitation of the silicon dioxide together with the impurities.

The above-mentioned processes have the disadvantage that they are very cost-intensive and that the precipitation of the particular silicate must take place at an alkaline pH value and cannot already be carried out in an acidic environment as in the subsequent electrolysis process.

BRIEF SUMMARY OF THE INVENTION

The objective of the present invention therefore is to provide a quickly operating process which signifies a simplified and improved procedure based on the conventional state of the art. A further objective of the invention is to provide a contrivance which can easily be integrated into existing chlorine-alkali electrolysis plants.

The invention achieves the objective by a process for removing silicon compounds from aqueous NaCl brine,
first a pH value of less than 3 being adjusted in a weak brine containing hydrochloric acid,
iron(III) chloride or other trivalent iron ions being added to the said acidified weak brine,
the obtained weak brine being continuously fed to a stirred dissolution vessel which contains undissolved salt in addition to brine,
fresh salt being charged batchwise and intermittently to the dissolution vessel,
the obtained strong brine being fed to a stirred buffer vessel,
the pH value in this buffer vessel being maintained at a level ranging from 5 to 8,
a strong-brine flow being continuously withdrawn from the buffer vessel and filtered, and
the filter cake containing the added iron and silicon being discharged.

In an embodiment of the process the weak brine laced with iron(III) chloride and having a pH value of 1 to 2 is fed to the dissolution vessel. In addition, the dissolution vessel can be provided with a further feed point for iron(III) chloride or other trivalent iron ions. It is possible, for example, to first meter 0.3 ppm of iron ions to the weak brine and then another 1 ppm of iron ions to the dissolution vessel.

Further embodiments of the process may provide to equip the dissolution vessel or buffer vessel or both with air jets for stirring.

Another embodiment of the process may provide to remove the brine from the discharged filter cake containing the added iron and silicon in a filter press, the brine being returned to the process.

The invention further achieves the objective by a contrivance for carrying out the described process, consisting of
a dissolution vessel for salt,
a stirrer in the dissolution vessel,
a feed device for batchwise feeding salt to the dissolution vessel,
a point for feeding weak brine to the dissolution vessel,
points for feeding hydrochloric acid and iron(III) chloride to the weak-brine supply line,
a buffer vessel for strong brine,
a stirrer in the buffer vessel,
a flow connection between the dissolution vessel and the buffer vessel,
a filter having an outlet for strong brine and a withdrawing device for filter cake,
a discharge port and a device for conveying strong brine from the buffer vessel to the filter.

There are embodiments of the process where the dissolution vessel and the buffer vessel form a structural unit and are separated by an overflow weir. The structural unit of dissolution vessel and buffer vessel is preferably designed as in the form of a basin. The weak brine is appropriately fed to the dissolution vessel by means of lines arranged at the bottom of the dissolution vessel, said lines being provided with openings in the form of boreholes or jets directed upwards so to accelerate the dissolving capacity of the device. In addition, an air jet or brine jet should be arranged in the dissolution vessel and aligned in such a way that a circulation flow can be generated around a vertical axis.

DETAILED DESCRIPTION OF THE INVENTION

Figure 1:
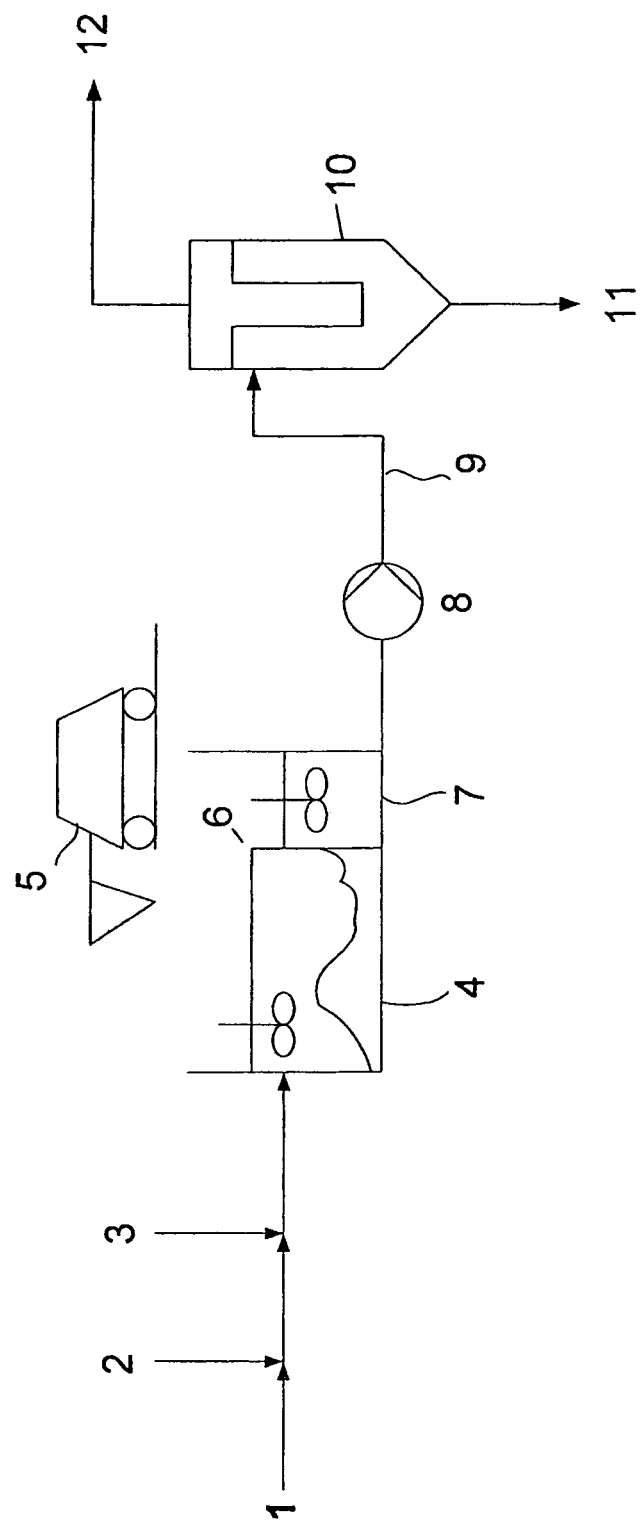
FIG. 1 shows a system for the current invention including dissolution vessel and buffer vessel, the feed devices and the subsequent filter for the strong brine.

The function of the invention is further detailed in the following on the basis of examples. FIG. 1 is a typical arrangement drawing showing the process including dissolution vessel and buffer vessel, the feed devices and the subsequent filter for the strong brine.

Weak brine 1 with a salt content of 220 kg/m$^3$ is adjusted to a pH value of 2 with the aid of hydrochloric acid 2. Then, depending on the silicon concentration in the fresh salt, few ppm of iron(III) chloride 3 are added to the acidified weak brine. Here, it is important that the pH value is sufficiently low because iron(III) chloride will only be stable if the pH value is below 4. If the pH value of the delivered weak brine is already <4, further acidification might also be implemented after the addition of iron(III) chloride.

The acidified weak brine laced with iron(III) chloride is fed to dissolution vessel 4 in which undissolved salt normally deposits at the bottom. At intervals of approx. 20 minutes fresh salt is filled into dissolution vessel 4 by means of feed device 5, which may, for example, be a shovel loader. Here, it is important that this charging takes place within a short period of time, i.e. for example, one shovel full at a time.

Beside sodium chloride as main constituent this fresh salt also contains typical secondary constituents, such as the silicon already mentioned, but also magnesium compounds and sodium carbonate as well as sodium hydroxide which are of a strongly basic effect. Therefore, within a few minutes after the addition of the fresh salt the pH value of the weak brine in dissolution vessel 4 quickly changes from 2 to 11 during the dissolving process, whereupon it drops again to the initial pH value of 2 within the next few minutes.

As soon as the pH value reaches 4, the iron(III) chloride begins to decompose and reacts to form iron hydroxide precipitating from the solution. From the purely visual point of view, the change from dissolved and greenish-transparent iron(III) chloride to iron hydroxide becomes apparent in that the brine changes colour to slightly brown. The precipitating iron hydroxide binds the silica and the other silicon compounds to itself. Here, it is assumed that this may be an adsorption process, the invention, however, not being bound to the correctness of this assumption.

On account of the precipitation reaction of the iron hydroxide it is important to add the salt quickly because there is only little time for the weak brine laced with iron(III) chloride to distribute uniformly in dissolution vessel 4 and only if uniform distribution has been achieved, can the existing silicon be absorbed by the entire volume of dissolution vessel 4. Therefore, it may be appropriate to support the quick distribution of the incoming weak brine with the aid of an efficient stirring system.

The strong brine with a salt content of approx. 300 kg/m$^3$ is fed from dissolution vessel 4 via overflow weir 6 to buffer vessel 7, the dimensions of which are such that a pH value at which iron hydroxide could react back into iron(III) chloride is absolutely avoided. In practice, a pH range of 5 to 8 has proven itself, at a pH value of >9 it was noticed that the co-separated silicon re-dissolved. Buffer vessel 7 should also be stirred since during some periods of the dissolving process strong brine with a pH value of <4 runs over from dissolution vessel 4 to buffer vessel 7. During these periods the precipitation reaction of the iron and the simultaneous binding of the silicon take place in buffer vessel 7 and the spatially uniform distribution must also be ensured in buffer vessel 7.

Strong brine 9 is withdrawn from buffer vessel 7 by means of brine pump 8 and filtered in filter 10. Filter residues 11 mainly consist of iron hydroxide and silica. These filter residues 11 can be pressed in a filter press (not shown) and the strong brine recovered there can be recycled to the buffer vessel. Purified strong brine 12 is almost free of iron and silica compounds and can be used for the NaCl electrolysis after further treatment steps if required.

Figure 2:
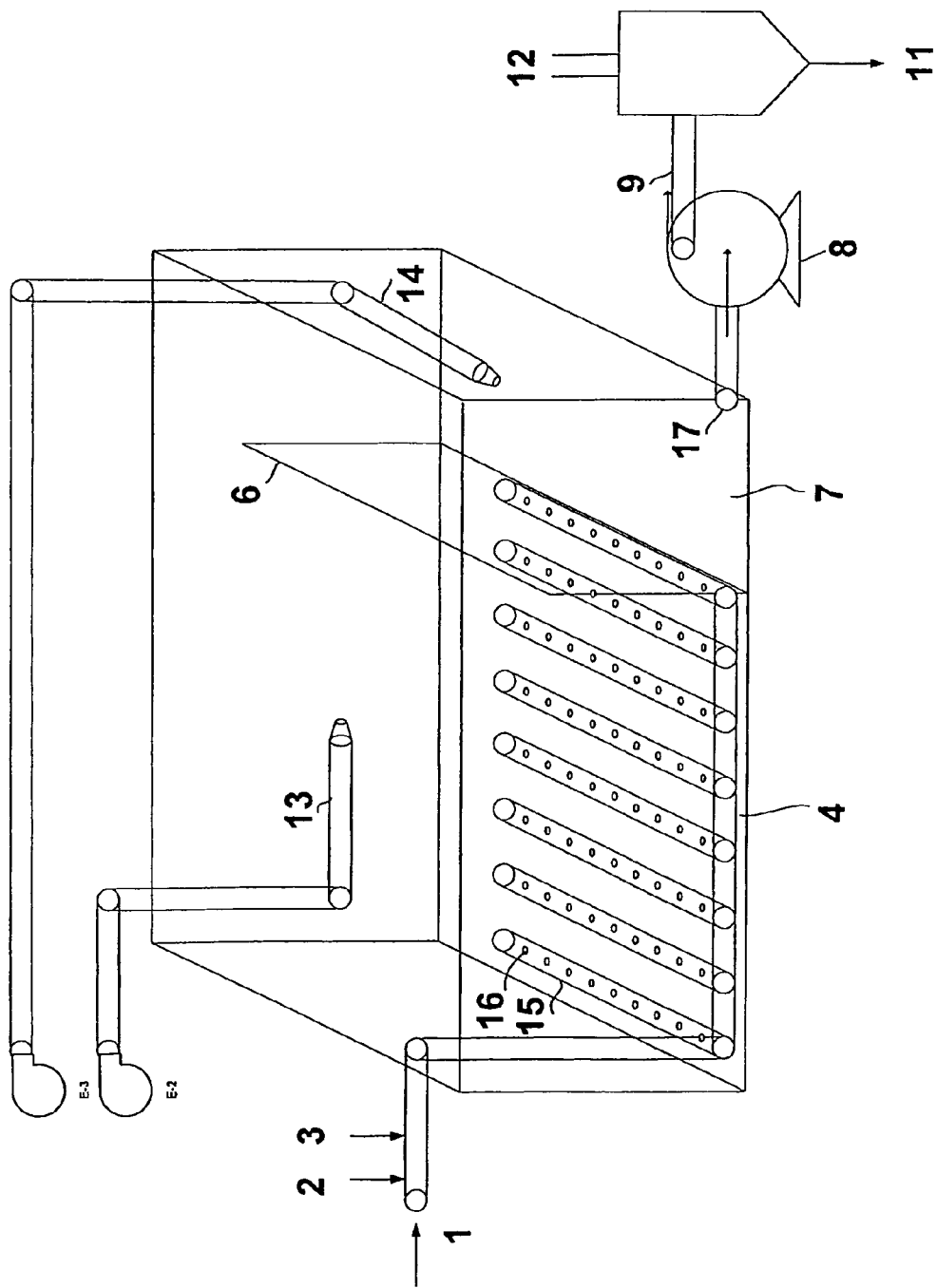
FIG. 2 shows a dissolution vessel and a buffer vessel with facilities.

The arrangement of the inventive contrivance is explained in the following on the basis of FIG. 2 showing a dissolution vessel and a buffer vessel with facilities. Dissolution vessel 4 and buffer vessel 7 are provided in a basin, the two vessels being separated by overflow weir 6. The basin is open towards the top.

For weak brine 1 a supply line is provided, to which also the feed entries for hydrochloric acid 2 and iron(III) chloride are connected, which leads into a weak-brine manifold 15 arranged at the bottom or just above the bottom of the dissolution vessel. Weak-brine manifold 15 consists of closed-end tubes provided with boreholes 16. Boreholes 16 point vertically towards the top but can also be aligned in such a way that they support a circulation flow in dissolution vessel 4. Dissolution vessel 4 is equipped with a stirrer in the form of an air jet or brine jet 3, connected to a fan or another pressure boosting device and provided with a jet through which air is blown below the liquid surface at great velocity. Buffer vessel 7 is also equipped with such an air jet or brine jet 14. It also comprises a strong-brine discharge 17 connected to brine pump 8 which pumps strong brine 9 to filter 10 which is equipped with a discharge for purified strong brine 12 and a discharge for filter residues 11.

LIST OF REFERENCE NUMBERS

1 Weak brine
2 Hydrochloric acid
3 Iron(III) chloride
4 Dissolution vessel
5 Feed device
6 Overflow weir
7 Buffer vessel
8 Brine pump
9 Strong brine
10 Filter
11 Filter residues
12 Purified strong brine
13 Dissolution vessel jet
14 Buffer vessel jet
15 Weak-brine manifold
16 Boreholes
17 Strong-brine discharge

The invention claimed is:

1. A process for removing silicon compounds from aqueous NaCl brine, comprising:
   a) adjusting a brine with weak NaCl concentration by adding hydrochloric acid to obtain an acidified brine with a pH value of less than 3;
   b) adding iron(III) chloride or other trivalent iron ions to the acidified brine obtained from step a) to obtain a mixture;
   c) continuously feeding the mixture thus obtained from step b) to a stirred dissolution vessel which contains undissolved salt in addition to brine;
   d) charging the stirred dissolution vessel batchwise and intermittently with fresh salt to obtain brine with strong NaCl concentration;
   e) feeding the brine with strong NaCl concentration obtained from step d) to a stirred buffer vessel;
   f) maintaining the pH value in the stirred buffer vessel at a level ranging from 5 to 8;
   g) continuously withdrawing and filtering a flow of brine with strong NaCl concentration from the stirred buffer vessel; and
   h) discharging a filter cake containing the added iron and the silicon compounds.

2. The process according to claim 1, wherein the mixture thus obtained from step b) is being continuously fed to the stirred dissolution vessel at a pH value of 1 to 2.

3. The process according to claim 1, wherein the iron(III) chloride or other trivalent iron ions are also fed to the stirred dissolution vessel.

4. The process according to claim 1, wherein the stirred dissolution vessel is stirred by means of a jet.

5. The process according to claim 1, wherein the stirred buffer vessel is stirred by means of a jet.

6. The process according to claim 1, wherein a purified brine is removed from a filter press that creates the filter cake containing the added iron and silicon compounds.

* * * * *